(12) United States Patent
Hsu

(10) Patent No.: US 10,705,744 B2
(45) Date of Patent: Jul. 7, 2020

(54) METHOD, DATA STORAGE SYSTEM, AND COMPUTER-READABLE RECORDING MEDIUM FOR DISK ARRAY DATA DISTRIBUTION

(71) Applicant: QNAP SYSTEMS, INC., New Taipei (TW)

(72) Inventor: Chin-Hsing Hsu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 9 days.

(21) Appl. No.: 16/106,000

(22) Filed: Aug. 21, 2018

(65) Prior Publication Data
US 2019/0332295 A1    Oct. 31, 2019

(30) Foreign Application Priority Data
Apr. 27, 2018 (TW) .............................. 107114464 A

(51) Int. Cl.
*G06F 3/06* (2006.01)
(52) U.S. Cl.
CPC .......... *G06F 3/0631* (2013.01); *G06F 3/0604* (2013.01); *G06F 3/067* (2013.01); *G06F 3/0679* (2013.01)
(58) Field of Classification Search
CPC ......... G06F 2212/7211; G06F 12/0246; G06F 2212/7208; G06F 3/0604; G06F 3/0679; G06F 3/06; G06F 3/0689; G06F 11/1076; G06F 11/1092; G06F 3/0631; G06F 3/067; G11C 14/00; G11C 16/00
See application file for complete search history.

(56) References Cited

U.S. PATENT DOCUMENTS

| 7,424,574 | B1 * | 9/2008 | Ahrens | .................... G06F 3/061 |
| | | | | 711/114 |
| 9,292,220 | B2 | 3/2016 | Gong | |
| 2017/0293438 | A1 * | 10/2017 | Hetzler | ............... G06F 12/0246 |

OTHER PUBLICATIONS

Super User. "The Differences between RAID 1E, RAID 5E, RAID 5EE." Data Recoup, 2016, web.archive.org/web/20160430041228/https:/www.datarecoup.com/blog/raid-data-recovery/the-differences-between-raid-1e-raid-5e-raid-5ee. (Year: 2016).*
Janssen, Cory. "What Is RAID 51?—Definition from Techopedia." Techopedia.com, 2014, web.archive.org/web/20141003084741/https://www.techopedia.com/definition/30719/raid-51. (Year: 2014).*
"Office Action of Taiwan Counterpart Application," dated Jan. 8, 2019, p. 1-p. 4.

* cited by examiner

*Primary Examiner* — Yaima Rigol
(74) *Attorney, Agent, or Firm* — JCIPRNET

(57) ABSTRACT

A method, a data storage system, and a computer-readable recording medium for disk array data distribution are proposed. The method includes the following steps. The space of a disk array composed of multiple flash storage devices is divided into multiple RAID extents with a same data distribution pattern, where each of the RAID extents includes a first region having multiple first stripes and first strips and also a second region having multiple second stripes and second strips. The first strips in each of the first stripes are evenly distributed among the flash storage devices in a first rotation pattern, and the second strips in each of the second stripes are unevenly distributed among the flash storage devices in a second rotation pattern.

16 Claims, 4 Drawing Sheets

METHOD, DATA STORAGE SYSTEM, AND COMPUTER-READABLE RECORDING MEDIUM FOR DISK ARRAY DATA DISTRIBUTION

CROSS-REFERENCE TO RELATED APPLICATION

This application claims the priority benefit of Taiwan application serial no. 107114464, filed on Apr. 27, 2018. The entirety of the above-mentioned patent application is hereby incorporated by reference herein and made a part of this specification.

TECHNICAL FIELD

The disclosure relates to a technique for disk array data distribution.

BACKGROUND

Each erase block of a flash storage device has a limited number of writes.

Firmware of such device may evenly use each erase block by leveraging wear-leveling techniques to prevent any erase block from being worn out prematurely than others. Thus, limited write amount is posed to such device. When a same write pattern of I/O is applied to a group of brand-new flash storage devices, it is highly possible that all devices in the group may have one or more than one blocks to be entirely worn out within a short period. Some other devices may be worn out before data reconstruction finishes and thus thereby result in permanent data corruption.

Take a RAID 1 array as an example, write data is mirrored to each member device of the RAID 1 array, either in a sequential or random access mode. Hence, multiple flash storage devices having same capacity, model number, firmware version with concurrent initial usage would be likely all worn out within a short time span. Such issue would also happen in N-way mirroring arrays or RAID 10 arrays. As for RAID 5 arrays and RAID 6 arrays, if each write is stripe-aligned, each flash device would be subjected to a same write I/O pattern and would be possibly worn out concurrently. Moreover, since commonly-used file systems, such as EXT4 and XFS, would permit the data extent size to be equal to the stripe size, same issue would more likely happen.

Some existing RAID 5 schemes would prevent the disks from concurrently being worn out by distributing parity blocks unevenly. However, such approach may be suitable for random writes, but not for stripe-aligned writes. The reason behind is that the data amount and the data write I/O pattern for each physical flash storage device would be the same under stripe-aligned write, and thus it does not prevent the flash storage devices in an array from concurrently being worn out when the whole stripe is written.

SUMMARY OF THE DISCLOSURE

Accordingly, a method, a data storage system, and computer-readable recording medium for disk array data distribution are proposed, where multiple flash storage devices in a disk array would be prevented from entirely worn out within a short time span.

According to one of the exemplary embodiments, the method includes the following steps. The space of a disk array composed of multiple flash storage devices is divided into multiple RAID extents with a same data distribution pattern, where each of the RAID extents includes a first region having multiple first stripes and first strips as well as a second region having multiple second stripes and second strips. The first strips in each of the first stripes are evenly distributed among the flash storage devices in a first rotation pattern, and the second strips in each of the second stripes are unevenly distributed among the flash storage devices in a second rotation pattern.

According to one of the exemplary embodiments, the data storage system includes a disk array composed of multiple flash storage devices and a processor. The processor is coupled to the disk array and configured to: divide space of the disk array into multiple RAID extents having a same data distribution pattern, where each of the RAID extents includes a first region and a second region, each of the first regions includes multiple first stripes and multiple first strips, and each of the second regions includes multiple second stripes and multiple second strips; distribute the first strips in each of the first stripes evenly among the flash storage devices in a first rotation pattern; and distribute the second strips in each of the second stripes unevenly among the flash storage devices in a second rotation pattern.

According to one of the exemplary embodiments, the computer-readable recording medium stores a computer program to be loaded to a data storage system including a disk array composed of multiple flash storage devices to perform steps of: dividing space of the disk array into multiple RAID extents having a same data distribution pattern, where each of the RAID extents includes a first region and a second region, each of the first regions includes multiple first stripes and multiple first strips, and each of the second regions includes multiple second stripes and multiple second strips; distributing the first strips in each of the first stripes evenly among the flash storage devices in a first rotation pattern; and distributing the second strips in each of the second stripes unevenly among the flash storage devices in a second rotation pattern.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
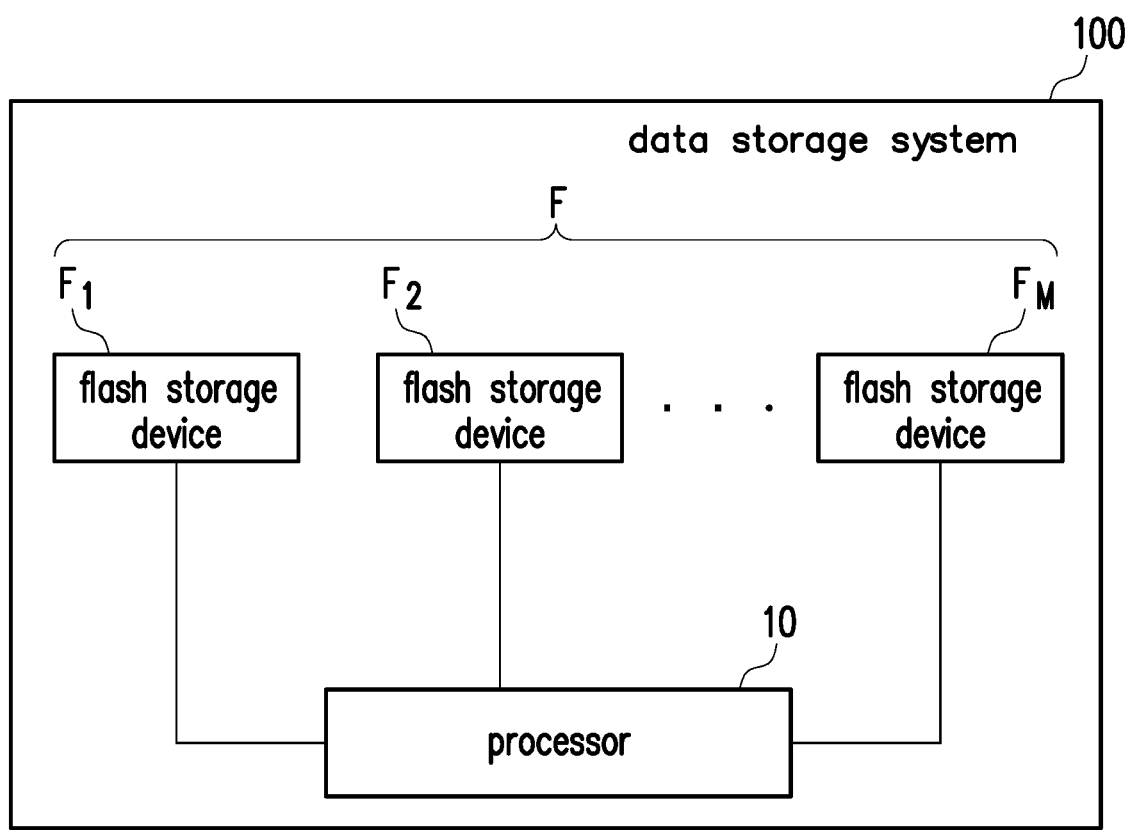
FIG. 1 illustrates a schematic diagram of a proposed data storage system in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be more fully described hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed data storage system in accordance with one of the exemplary embodiments of the disclosure. All components of the data storage system and their configurations are first introduced in FIG. 1. The functionalities of the components are disclosed in more detail in conjunction with FIG. 2.

Referring to FIG. 1, a data storage system 100 would include a disk array F composed of flash storage devices $F_1$-$F_M$ and a processor 10. In the present exemplary embodiment, the data storage system 100 may be a desktop computer, a laptop computer, a tabular computer, or other computer systems with computing capabilities. In an exemplary embodiment, the flash storage devices $F_1$-$F_M$ and the processor 10 would be all built-in in the data storage system 100, and the flash storage devices $F_1$-$F_M$ are respectively electrically connected to the processor 10. In another exemplary embodiment, the flash storage devices $F_1$-$F_M$ may be external devices and electrically connected to the processor 10 built-in in the data storage system 100 through an external connection, such as via a transmission line or a bus. The disclosure is not limited in this regard.

The processor 10 may be, for example, a central processing unit (CPU), or other programmable devices for general purpose or special purpose such as a microprocessor, a digital signal processor (DSP), a programmable controller, a control chip, an application specific integrated circuit (ASIC), a programmable logic device (PLD), other similar devices, integrated circuits, or a combination of the aforementioned devices.

In general, when a SSD manufacture designs firmware, part of disk storage space would be preserved for over-provisioning (OP). OP may enhance the efficiency and the durability of a SSD and thereby extend its lifetime. Besides OP space preserved for a SSD, RAID software or firmware may also only access a fixed portion of space that is less than the capacity of the disk, where the rest of the disk may be set as dynamic OP space of the SSD. In the following exemplary embodiment, through the aforementioned scheme, at least one strip in each stripe of the disk array F is reserved for OP space, and some stripes are unevenly distributed with the OP space in a fixed pattern so as to prevent multiple flash storage devices in a disk array from being entirely worn out within a short time span and data corruption.

Figure 2:
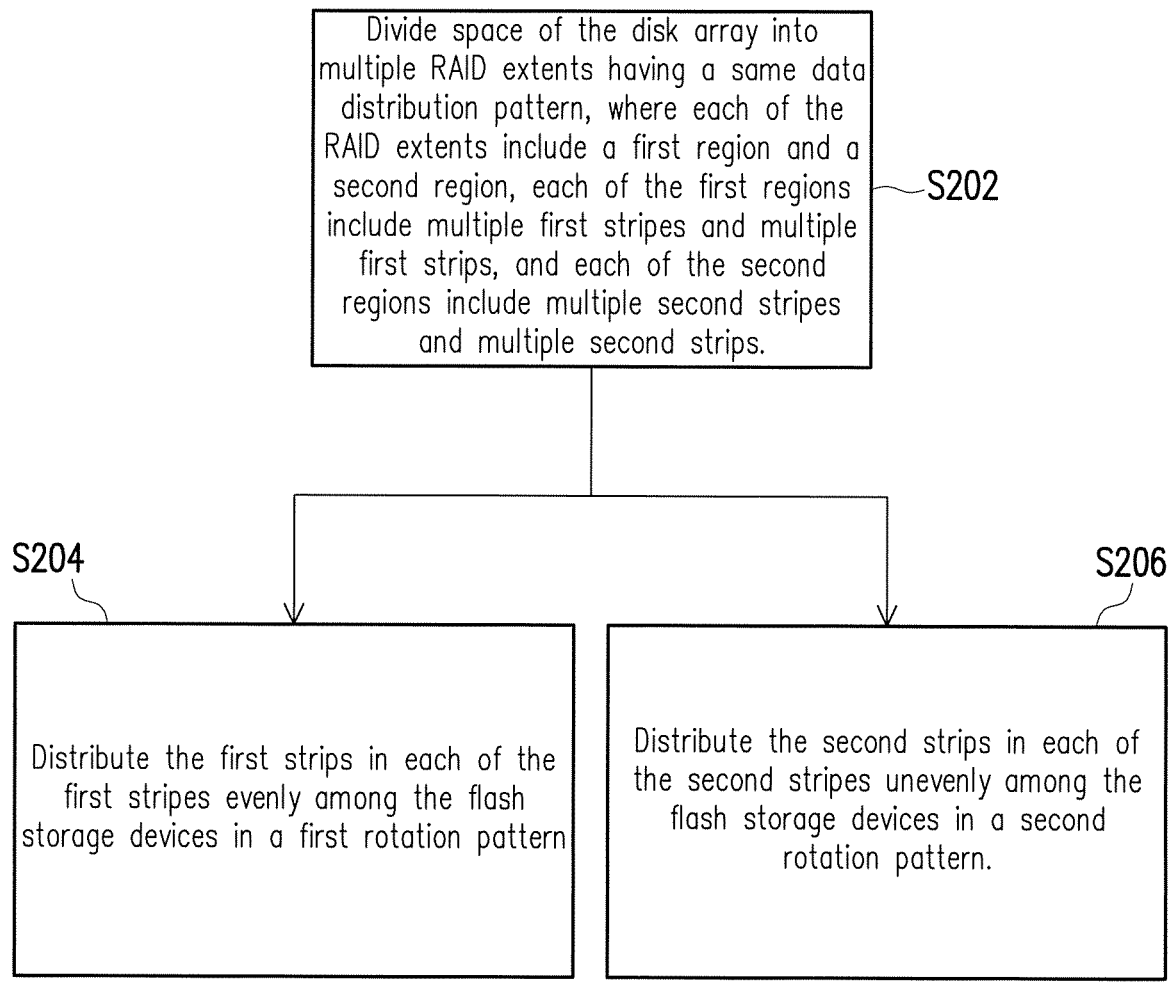
FIG. 2 illustrates a proposed disk array data distribution method in accordance with one of the exemplary embodiments of the disclosure.

FIG. 2 illustrates a proposed disk array data distribution method in accordance with one of the exemplary embodiments of the disclosure. The steps of FIG. 2 could be implemented by the proposed data storage system 100 as illustrated in FIG. 1.

Referring to FIG. 2 in conjunction with FIG. 1, the processor 10 of the data storage system 100 would divide space of the disk array F into multiple RAID extents having a same data distribution pattern, where each of the RAID extents would include a first region and a second region, each of the first regions would include multiple first stripes and multiple first strips, and each of the second regions would include multiple second stripes and multiple second strips (Step S202). To be specific, the data distribution of the disk array F would be a repeated cycle in a particular arrangement, and an extent formed by each cycle in the disk array F would be defined as a RAID extent. Each of the RAID extents would have a same quantity of stripes and may be further divided into the first region and the second region, where the strips in the first region would be defined as "the first strips", and the strips in the second region would be defined as "the second strips". Next, the processor 10 would distribute the first strips in each of the first stripes evenly among the flash storage devices $F_1$-$F_M$ in a first rotation pattern (Step S204) and distribute the second strips in each of the second stripes unevenly among the flash storage devices $F_1$-$F_M$ in a second rotation pattern (Step S206).

One of the RAID extents would be illustrated to describe the flow in FIG. 2 hereafter, and others may be deduced in a similar fashion. Moreover, a distribution of OP space would be illustrated in the following exemplary embodiments, and yet the disclosure is not limited in this regard.

As for a single RAID extent, the processor 10 may first obtain a quantity M of the flash storage devices in the disk array F so as to accordingly set a quantity N of the strips distributed as OP space in each of the first stripes and each of the second stripes, where N is less than M. In other words, N strips in each of the first stripes and second stripes respectively would be set as the OP space. As an example of a RAID, (M-N) would be greater than or equal to a minimum quantity of strips required per stripe for a specific RAID level. For example, (M-N) would be greater than or equal to 2, 3, and 4 respectively for RAID1, RAID5, and RAID 6. Hence, $$\frac{N}{M}$$

of the disk array F would be the OP space. In the present exemplary embodiment, one strip in each of the first stripes and the second stripes would be set as the OP space, i.e. N=1.

Since the data distribution of a normal disk array would form a repeated cycle in a particular arrangement, the processor 10 would set or arrange different quantities $S=\{S_{i}\}i=1^{M}$ of strips able to store data or fault-tolerance data in each of the flash storage devices $F_1$-$F_M$, where i denotes a numbering of each of the flash storage devices, and S forms an arithmetic sequence. That is, the value of each term in the arithmetic sequence represents the quantity of strips able to store data or fault-tolerance data in the corresponding flash storage device in each cycle. This may be achieved by setting a quantity of strips for the OP space in each of the flash storage devices $F_1$-$F_M$. Afterwards, these OP strips would be distributed in each of the RAID extents in a fixed pattern.

Assume that all the flash storage devices $F_1$-$F_M$ are solid-state drives (SSDs) with same model number and size. The value of the first term $S_1$ in the arithmetic sequence S is associated with the durability of the flash storage device $F_1$. The processor 10 may determine the durability of a SSD based on SLC, MLC, or TLC SSD technology as well as attributes from a self-monitoring analysis and reporting technology (S.M.A.R.T.) report of the SSD. The value of the first term $S_1$ may be larger for a disk array formed by SSDs with a higher durability, and conversely, it may be smaller for a disk array formed by SSDs with a lower durability. The purpose of restricting the first term is to avoid the first SSD dying out sooner than the others and to avoid a worn-out time span between SSDs being too short for data reconstruction. Since a same erase block in a SSD may be written for at least several hundreds of times, the value of the first term may be more than 100. Also, since a fixed data distribution pattern is used, the data distribution of any stripe may be determined based on its numbering through software program.

For example, assume that there exist four flash storage devices in a disk array and an arithmetic sequence {100, 99, 98, 97} is given. When data is written stripes sequentially, it means that after the first flash storage device is fully written 100 times, the second flash storage device would be fully written 99 times, the third flash storage device would be fully written 98 times, and the fourth flash storage device would be fully written 97 times. Assume that such type of flash storage devices is only allowed to be written 100 times. This implies that once the first flash storage device is worn out, the second, third, and fourth flash storage devices would be allowed to be fully written for another 1, 2, and 3 times respectively before worn out. The processor 10 may perform and complete data reconstruction on the first flash storage device after the first flash storage device is worn out and before the second flash storage device is fully written for another 1 time. Table 1 illustrates a sequence of lifetimes left for all the flash storage devices after all of which have been worn out and completed data reconstruction. After all the flash storage devices are replaced, relative differences of lifetimes among new flash storage devices would remain the same.

TABLE 1

| Status of Flash Storage Devices | Lifetimes Left for Flash Storage Devices |
|---|---|
| First flash storage device is fully written 100 times. | {0, 1, 2, 3} |
| First flash storage device completes data reconstruction. | {99, 1, 2, 3} |
| Second flash storage device is fully written 100 times. | {98, 0, 1, 2} |
| Second flash storage device completes data reconstruction. | {98, 99, 0, 1} |
| Third flash storage device is fully written 100 times. | {97, 98, 99, 1} |
| Third flash storage device completes data reconstruction. | {97, 98, 99, 1} |
| Fourth flash storage device is fully written 100 times. | {96, 97, 98, 0} |
| Fourth flash storage device completes data reconstruction. | {96, 97, 98, 99} |

Hence, the processor 10 would distribute the data, fault-tolerance data and the OP space evenly in the first region in each RAID extent, and the difference would appear in the second region in each RAID extent. The processor 10 may set a quantity X of the first stripes and a quantity W of the second stripes in each RAID extent (i.e. region sizes of the first region and the second region) according to the quantity M, the quantity N and the quantity $S=\{S_i\}_{i=1}^{M}$. Assume that the sequence S is an arithmetic sequence with a common difference of −1. The quantity W of the second stripes in each RAID extent would be expressed as follows, $$W = 0 + 1 + 2 + \ldots + (M-1) = \frac{M(M-1)}{2}.$$

On the other hand, since the first stripes are distributed with the data, fault-tolerance information and the OP space evenly and N=1, a quantity $$\frac{X(M-1)}{M}$$

of the first stripes in the first flash storage device $F_1$ would be distributed with data or fault-tolerance data. Since only data and fault-tolerance information are distributed in the second region of the flash storage device $F_1$, $$\frac{X(M-1)}{M} + W = S_1.$$

Hence, the quantity X of the first stripes would be $$X = \frac{(S_1 - W)M}{M-1}.$$

After completion of setting all the RAID extents as well as their first regions and second regions, the processor 10 would distribute at least one of the first strips in each of the first stripes evenly among the flash storage devices $F_1$-$F_M$ as the OP space in the first rotation pattern. The first rotation pattern would allow the OP space to be distributed evenly among all the flash storage devices $F_1$-$F_M$. The processor 10 would define the first rotation pattern as each of the first stripes rotating once to the left or rotating once to the right with respect to its previous first stripe and designate one of the strips in each of the first stripes as the OP space in the first rotation pattern.

Additionally, the processor 10 would distribute at least one of the second strips in each of the second stripes unevenly among the flash storage devices $F_1$-$F_M$ as the OP space in the second rotation pattern. The second rotation pattern would allow the OP space to be distributed to a different quantity of strips in each of the flash storage devices $F_1$-$F_M$. The processor 10 would define the second rotation pattern as (M−1) of the second stripes rotating 0 times, (M−2) of the second stripes rotating one time, . . . , and 1 of the second stripes rotating (M−1) times, wherein M is a quantity of the flash storage devices and designate one of the strips in each of the second stripes as the OP space in the second rotation pattern.

That is, in each of the RAID extents, the processor 10 would distribute the OP space to X consecutive stripes (i.e. all the first stripes in the first region) in the first rotation pattern and distribute the OP space to W consecutive stripes (i.e. all the second stripe in the second region) in the second rotation pattern. Thus, given the same amount of available space provided by a disk array, only one additional flash storage device would be required in the present exemplary embodiment. Not only would the efficiency and the durability of the flash storages devices $F_1$-$F_M$ be enhanced by preserving the OP space in the disk array F, but would also prevent the flash storage devices $F_1$-$F_M$ in the disk array F from concurrently being worn out in a particular access pattern.

For better comprehension, different exemplary embodiments would be given as follows to provide detailed explanation for the aforementioned steps. It should be noted that, the aforementioned method is applicable to a disk array in any fault-tolerance scheme as known per se. Hence, the processor 10 may set a fault-tolerance algorithm prior to the aforementioned steps. For example, FIG. 3 and FIG. 4 respectively illustrate data distributions of a RAID extent in a disk array in accordance with an exemplary embodiment of the disclosure, where FIG. 3 is based on a 3-way mirroring scheme, and FIG. 4 is based on a single parity RAID scheme.

Figure 3:
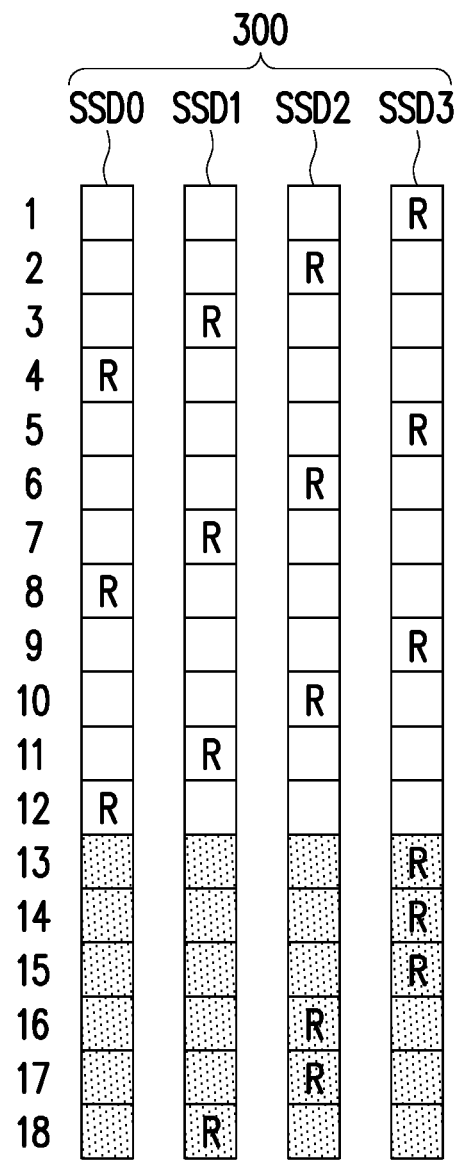
FIG. 3 illustrates a data distribution of a RAID extent in a disk array in accordance with an exemplary embodiment of the disclosure.

Referring to FIG. 3, a disk array 300 is composed of four SSDs, i.e. SSD0, SSD1, SSD2, and SSD3, where 75% of the space would be used as 3-way mirroring space, and 25% of the space would be used as OP space. Assume that 18 stripes are included in a single RAID extent. The quantities of writeable stripes distributed across the four SSDs {SSD0, SSD1, SSD2, SSD3} may be represented by an arithmetic sequence {15, 14, 13, 12}. Hence, based on the formulas provided previously, 12 stripes would be distributed with OP space R in the first region in the first rotation pattern, and 6 stripes would be distributed with OP space R in the second region in the second rotation pattern. In the present exemplary embodiment, each of the stripes numbering 1-12 would be evenly distributed with the OP space R by rotating each stripe once to the left with respect to its previous stripe, and each of the stripes numbering 13-18 would be distributed with the OP space R by rotating 3 stripes to the left 0 times, 2 stripes to the left 1 time, and 1 stripe to the left 2 times. With 18 stripes for each cycle would attain data write amount with a ratio of 15:14:13:12 for a disk array with 4 SSDs.

Figure 4:
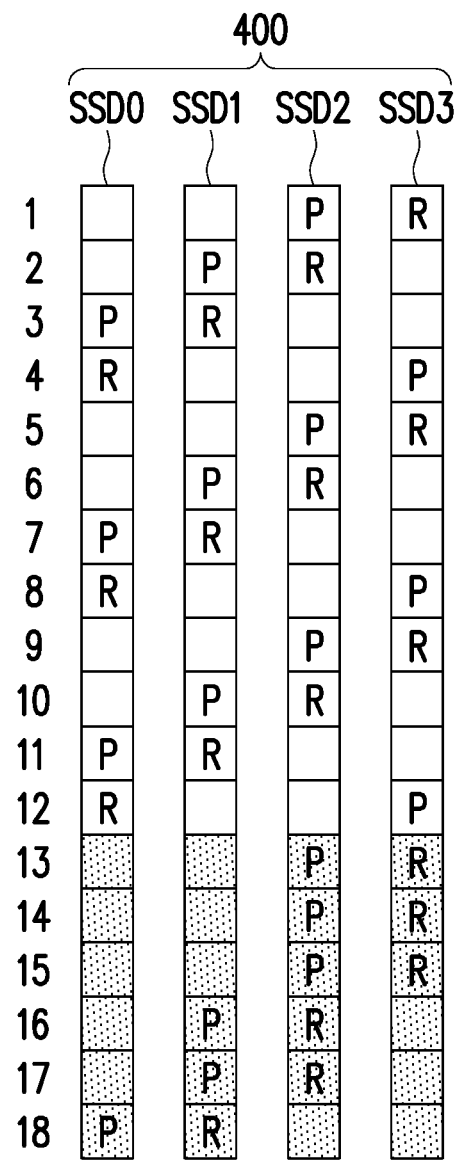
FIG. 4 illustrates a data distribution of a RAID extent in a disk array in accordance with another exemplary embodiment of the disclosure.

Referring to FIG. 4, a disk array 400 is composed of four SSDs, i.e. SSD0, SSD1, SSD2, and SSD3, where 25% of the space would be used as parity space P, and 25% of the space would be used as OP space R. The distribution of the OP space R in FIG. 3 would also be applicable to the disk 400 and would not be repeated herein for brevity purposes.

As a side note, the processor 10 may determine the number of data rotation times of each stripe according to its numbering based on the following pseudocode, where M denotes a quantity of flash storage devices, Z denotes a quantity of stripes in a single RAID extent, X denotes a quantity of stripes in a single first region, S denotes a stripe numbering with respect to a whole disk array, O denotes a stripe numbering with respect to a single RAID extent, and R denotes the number of left rotation.

```
O = S MOD Z;
if (O < X) {
    R = O MOD M;
} else {
    O = O - X;
    R = 0;
    while (O >= (M - R - 1)) {
        O = O - (M - R - 1);
        R = R + 1;
    }
}
```

The disclosure also provides a non-transitory computer readable medium, which records computer program to be loaded into a data storage system to execute the steps of the aforementioned method. The computer program is composed of a plurality of program instructions (for example, an organization chart, establishing program instruction, a table approving program instruction, a setting program instruction, and a deployment program instruction, etc), and these program instructions are loaded into the data storage system and executed by the same to accomplish various steps of the method for disk array data distribution.

In summary, in the proposed method, data storage system, and computer-readable recording medium for disk array data distribution, at least one strip in each stripe of a disk array is reserved for, for example, OP space, and some stripes are unevenly distributed with the OP space in a fixed pattern so as to prevent multiple flash storage devices in a disk array from entirely worn out within a short period of time. Such scheme may not only applicable to a parity protected disk array like RAID 5 and RAID 6 but also applicable to a mirroring disk array for random write data to prevent from being concurrently worn out. Moreover, since write data patterns would not be necessarily consistent, such scheme may be used in conjunction with other reconstruction schemes to prevent data in a disk array from permanently corrupted.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for disk array data distribution, applicable to a data storage system comprising a disk array composed of a plurality of flash storage devices, and comprising steps of:
dividing space of the disk array into a plurality of RAID extents having a same data distribution pattern, wherein each of the RAID extents comprises a first region and a second region, wherein each of the first regions comprises a plurality of first stripes and a plurality of first strips, and wherein each of the second regions comprises a plurality of second stripes and a plurality of second strips;
distributing the first strips in each of the first stripes evenly among the flash storage devices in a first rotation pattern, wherein at least one of the first strips is distributed in each of the first stripes evenly among the flash storage devices as over-provisioning (OP) space in the first rotation pattern; and distributing the second strips in each of the second stripes unevenly among the flash storage devices in a second rotation pattern, wherein at least one of the second strips is distributed in each of the second stripes unevenly among the flash storage devices as the OP space in the second rotation pattern, wherein the second rotation pattern allows the number of the second strips distributed as the OP space in each of the flash storage devices to be different, wherein the step of dividing the space of the disk array into the RAID extents comprises:

for each of the RAID extents:

obtaining a quantity M of the flash storage devices so as to accordingly set a quantity N of the strips distributed as the OP space in each of the first stripes and each of the second stripes, wherein N is less than M;

setting different quantities $S=\{S_i\}_{i=1}^{M}$ of strips able to store data or fault-tolerance data in each of the flash storage devices in the RAID extent, wherein i denotes a numbering of each of the flash storage devices; and setting a quantity X of the first stripes and a quantity W of the second stripes in the RAID extent according to the quantity M, the quantity N, and the quantities $S=\{S_i\}_{i=1}^{M}$.

2. The method according to claim 1, wherein the disk array is a RAID, and wherein before the step of dividing the space of the disk array into the RAID extents, the method further comprises:

setting a fault-tolerance algorithm used for the disk array.

3. The method according to claim 2, wherein (M−N) is greater than or equal to a minimum quantity of strips required in each stripe of a RAID level.

4. The method according to claim 1, wherein the quantity N of the first strips in each of the first stripes and the second strips in each of the first stripes is 1.

5. The method according to claim 1, wherein for each of the RAID extents, the quantities $S=\{S_i\}_{i=1}^{M}$ of strips able to store data or fault-tolerance data in each of the flash storage devices form an arithmetic sequence.

6. The method according to claim 5, wherein $S_1$ is associated with durability of the flash storage devices.

7. The method according to claim 1, wherein the quantity N of the first strip in each of the first stripes and the second strip in each of the second stripes is 1, wherein the quantities $S=\{S_i\}_{i=1}^{M}$ of the strips able to store data or fault-tolerance data in each of the flash storage devices in the RAID extent form an arithmetic sequence with a common difference of −1, and wherein the step of setting the quantity X of the first stripes and the quantity W of the second stripes in the RAID extent according to the quantity M, the quantity N, and the quantities $S=\{S_i\}_{i=1}^{M}$ comprises:

setting the quantity $$W = \frac{M(M-1)}{2};$$

and setting the quantity $$X = \frac{(S_1 - W)M}{M-1}.$$

8. The method according to claim 1, wherein the step of distributing the at least one of the first strips in each of the first stripes evenly among the flash storage devices as the OP space in the first rotation pattern comprises:

defining the first rotation pattern as each of the first stripes rotating once to the left or rotating once to the right with respect to a previous first stripe thereof; and for each of the first stripes, designating one of the strips in the first stripe as the OP space and setting the designated strip in the first stripe as the first strip in the first rotation pattern.

9. The method according to claim 1, wherein the step of distributing the at least one of the second strips in each of the second stripes unevenly among the flash storage devices as the OP space in the second rotation pattern comprises:

defining the second rotation pattern as i of the second stripes rotating j times, wherein i and j are positive integers, i decreases from (M−1) to 1, j increases from 0 to (M−1), and M is a quantity of the flash storage devices; and for each of the second stripes, designating one of the strips in the second stripe as the OP space and setting the designated strip in the second stripe as the second strip in the second rotation pattern.

10. The method according to claim 1, wherein after the step of distributing the OP space in the first rotation pattern and the second rotation pattern, the method further comprises:

obtaining a corresponding data distribution according to a numbering of each of the first stripes and each of the second stripes in the disk array.

11. The method according to claim 1, wherein the disk array is a mirror array.

12. A data storage system comprising:

a disk array, composed of a plurality of flash storage devices; and a processor, coupled to the disk array and configured to:

divide space of the disk array into a plurality of RAID extents having a same data distribution pattern, wherein each of the RAID extents comprises a first region and a second region, wherein each of the first regions comprises a plurality of first stripes and a plurality of first strips, and wherein the second regions comprises a plurality of second stripes and a plurality of second strips;

distribute the first strips in each of the first stripes evenly among the flash storage devices in a first rotation pattern, wherein the processor distributes at least one of the first strips in each of the first stripes evenly among the flash storage devices as over-provisioning (OP) space in the first rotation pattern; and distribute the second strips in each of the second stripes unevenly among the flash storage devices in a second rotation pattern, wherein the processor distributes at least one of the second strips in each of the second stripes unevenly among the flash storage devices as the OP space in the second rotation pattern, wherein the second rotation pattern allows the number of the second strips distributed as the OP space in each of the flash storage devices to be different, wherein for each of the RAID extents, the processor obtains a quantity M of the flash storage devices so as to accordingly set a quantity N of the strips distributed as the OP space in each of the first stripes and each of the second stripes, sets different quantities $S=\{S_i\}_{i=1}^{M}$ of strips able to store data or fault-tolerance data in each of the flash storage devices in the RAID extent, and sets a quantity X of the first stripes and a quantity W of the second stripes in the RAID extent according to the quantity M, the quantity N, and the quantities $S=\{S_i\}_{i=1}^{M}$, wherein N is less than M, and wherein i denotes a numbering of each of the flash storage devices.

13. The data storage system according to claim 12, wherein for each of the RAID extents, the quantities $S=\{S_i\}_{i=1}^{M}$ of strips able to store data or fault-tolerance data in each of the flash storage devices form an arithmetic sequence, and wherein $S_1$ is associated with durability of the flash storage devices.

14. The data storage system according to claim 12, wherein the processor defines the first rotation pattern as each of the first stripes rotating once to the left or rotating once to the right with respect to a previous first stripe thereof, and wherein for each of the first stripes, the designates one of the strips in the first stripe as the OP space and sets the designated strip in the first stripe as the first strip in the first rotation pattern.

15. The data storage system according to claim 12, wherein the processor defines the second rotation pattern as i of the second stripes rotating j times, wherein i and j are positive integers, i decreases from (M−1) to 1, j increases from 0 to (M−1), and wherein for each of the second stripes, the processor designates one of the strips in the second stripe as the OP space and setting the designated strip in the second stripe as the second strip in the second rotation pattern, wherein M is a quantity of the flash storage devices.

16. A non-transitory computer-readable recording medium, storing a computer program to be loaded to a data storage system comprising a disk array composed of a plurality of flash storage device to perform steps of:

dividing space of the disk array into a plurality of RAID extents having a same data distribution pattern, wherein each of the RAID extents comprises a first region and a second region, wherein each of the first regions comprises a plurality of first stripes and a plurality of first strips, and wherein each of the second regions comprises a plurality of second stripes and a plurality of second strips;

distributing the first strips in each of the first stripes evenly among the flash storage devices in a first rotation pattern, wherein at least one of the first strips is distributed in each of the first stripes evenly among the flash storage devices as over-provisioning (OP) space in the first rotation pattern; and distributing the second strips in each of the second stripes unevenly among the flash storage devices in a second rotation pattern, wherein at least one of the second strips is distributed in each of the second stripes unevenly among the flash storage devices as the OP space in the second rotation pattern, wherein the second rotation pattern allows the number of the second strips distributed as the OP space in each of the flash storage devices to be different, wherein the step of dividing the space of the disk array into the RAID extents comprises:

for each of the RAID extents:
  obtaining a quantity M of the flash storage devices so as to accordingly set a quantity N of the strips distributed as the OP space in each of the first stripes and each of the second stripes, wherein N is less than M;
  setting different quantities $S=\{S_i\}_{i=1}^{M}$ of strips able to store data or fault-tolerance data in each of the flash storage devices in the RAID extent, wherein i denotes a numbering of each of the flash storage devices; and
  setting a quantity X of the first stripes and a quantity W of the second stripes in the RAID extent according to the quantity M, the quantity N, and the quantities $S=\{S_i\}_{i=1}^{M}$.

* * * * *